United States Patent [19]

Hall, Jr.

[11] 4,076,488

[45] Feb. 28, 1978

[54] SELECTIVE FIRING MECHANISM FOR ARRAY OF PERCUSSIVE FLASHLAMPS

[75] Inventor: Harold H. Hall, Jr., Marblehead, Mass.

[73] Assignee: GTE Sylvania Incorporated, Stamford, Conn.

[21] Appl. No.: 696,146

[22] Filed: Jun. 14, 1976

[51] Int. Cl.² .............................................. F21K 5/02
[52] U.S. Cl. .................................... 431/93; 362/1.3
[58] Field of Search ....................... 431/92, 93; 240/1.3

[56] References Cited

U.S. PATENT DOCUMENTS

| 3,735,111 | 5/1973 | Shaffer | 431/93 |
| 3,753,390 | 8/1973 | Hough et al. | 431/92 |
| 3,765,079 | 10/1973 | Pfefferle et al. | 431/93 |

Primary Examiner—Carroll B. Dority, Jr.
Assistant Examiner—Robert Charvat
Attorney, Agent, or Firm—Edward J. Coleman

[57] ABSTRACT

For a device comprising a plurality of percussively-ignitable flashlamps mounted on a support member and arranged in an array, a selective mechanism for sequentially firing respective flashlamps in response to successive indexing. The selective firing mechanism comprises a spring-loaded ratchet bar retained in a longitudinal channel in the support member in combination with a slidable member which is also retained in the channel in engageable contact with the ratchet bar. The lamps have respective depending primer tubes and are mounted in a row parallel to the channel with the primer tubes overlying the channel. The slidable member may comprise a helical torsion spring having a first leg for engaging the ratchet bar and a second leg projecting as a striker in alignment with the overlying primer tubes and adapted for resiliently engaging them. Upon successive actuation of the ratchet bar, the slidable member is indexed along the channel so that the resilient striker projecting therefrom sequentially fires the flashlamps.

17 Claims, 5 Drawing Figures

SELECTIVE FIRING MECHANISM FOR ARRAY OF PERCUSSIVE FLASHLAMPS

BACKGROUND OF THE INVENTION

This invention relates to flashlamp assemlbies and, mor particularly, to a device comprising an array of percussively ignitable flashlamps with a mechanism for permitting selective firing of the flashlamps in response to successive actuation. A particular embodiment of interest is that of a signal device intended for hand operation.

A copending application Ser. No. 696,107, filed concurrently herewith and assigned to the present assignee, describes an improved signal device of the type which generates intense flashes of light and provides the advantages of being compact, light weight, safe, relatively inexpensive, and not requiring batteries or an electric cord connection for operation. More specifically, a hand held signal device is described comprising a plurality of percussively ignitable flashlamps mounted on a support member along with a plurality of preenergized striker springs, each releasable to fire a respective flashlamp. In order to selectively fire the eight lamps in sequence, a slide member having a projecting trip wire is retained in a channel parallel to the row of flashlamps and in alignment with the striker springs, which in the cocked condition project beyond the periphery of the channel. To operate the device, a user grasps the periphery of the unit enclosure with one or two hands, faces the lamps in the direction of the intended viewer, and with is thumb slides the movable member along the channel to trip the strikers.

Although providing a relatively simple and inexpensive signal device, the unit described in the aforementioned copending application generally requies two hands for holding the device and firing the lamps, and is somewhat awkward for single-handed operation. In certain emergency situations, such as a person handling a boat in distress or floating in the water by the aid of a life-vest and clutching an overturned boat, it is particularly advantageous to have a signal device which may be very conveniently operated with one hand.

Another copending application Ser. No. 695,991, filed concurrently herewith and assigned to the present assignee, describes a signal device particularly adapted for single-handed operation. In this instance, firing of the lamps is provided by a selective actuating mechanism comprising a spring-loaded ratchet bar retained in a longitudinal channel in the support member which is located parallel to the row of flashlamps. A slidable member is also retained in the channel in engageable contact with the ratchet bar. Means is provided on the slidable member for sequentially releasing the preenergized striker springs to fire respective ones of the flashlamps in response to successive hand actuation of the ratchet bar and the resulting indexing of the slidable member engaged therewith along the channel.

In a preferred embodiment, light-shield partitions are disposed between respective pairs of the flashlamps to prevent sympathetic ignition, and a cover having at least one transparent side is fixed to the support member so as to enclose the assembly. The slidable member comprises a folded flat spring having a first tang for engaging one of the teeth on the ratchet bar and a second tang for engaging a surface of the support member channel to thereby prevent the slidable member from reversing direction following indexing thereof. The release means comprises a sloping trip wire projecting from the slidable member and disposed so that its path of travel is aligned with projecting portions of the striker springs. A push button is attached to one end of the ratchet bar and is externally accessible for indexing by hand to operate the signal device. Accordingly, a manually operated signal device is provided which can be fired with a single hand very comfortably using a relatively inexpensive trigger device.

One disadvantage of the firing mechanism described in the above referenced application Ser. No. 695,991, however, is the need for a preenergized striker spring for each lamp in the array. Thus, in an array of 16 lamps, for example, 16 firing springs are required. From a manufacturing point of view these springs add to the cost of th device both from a material and assembly point of view. Another disadvantage of the lamp firing springs is that they decrease the packing density of lamps insertable in the array package. This is so because each spring requires approximately 0.0625 inch of linear space along the lamp base. Thus, for instance, in a 10-lamp linear array the package has to be increased 0.625 inches in length to accommodate the lamp springs. A further disadvantage of individual lamp springs in that a portion of the light emitted from the lamps was masked by the spring wires. Further, usage of the lamp springs requires lamps to be offset with respect to the slider trip wires, which in turn necessitates offsetting of the lamps in the finished array package if a minimum depth dimension is desired. Such a geometry can place one wall of each lamp in a very close proximity to the package wall, at which point undesirable heating can occur during lamp flashing. Yet another disadvantage of the many springs needed in the array described is that their usage visually detracts from the aesthetic appearance of the array package.

SUMMARY OF THE INVENTION

Accordingly, it is an object of the present invention to provide an improved selective firing mechanism for a flashlamp assembly containing an array of percussive flashlamps.

A further object of the invention is to provide an improved signal device of he type which generates intense flashes of light but which has a very simplified firing mechanism and is relatively inexpensive and convenient to use, in addition to being compact, light weight, and not requiring batteries or an electric cord connection for operation.

These and other objects, advantages and features are attained in accordance with the invention, by using a single striker means in a flashlamp assembly including a plurality of percussively ignitable flashlamps mounted in a row on a support member. More specifically, a selective firing mechanism for the assembly comprises a spring-loaded ratchet bar retained in a longitudinal channel in the support member parallel to the row of flashlamps. A slidable member is also retained in the channel in engageable contact with the ratchet bar. Striker means is provided on the slidable member for resiliently engaging the flashlamps and sequentially firing respective ones of the flashlamps in response to successive actuation of the ratchet bar and the resulting indexing of the slidable member engaged therewith along the channel.

In a preferred embodiment, light-shield partitions are disposed between respective pairs of the flashlamps to prevent sympathetic ignition, and a cover having at least one transparent side is fixed to the support member so as to enclose the assembly. The lamps have respective depending primer tubes and are mounted with the row of primer tubes overlying the channel which is parallel with the lamps. The slidable member comprises a helical torsion spring retained in the channel and having a first leg for engaging one of the teeth on the ratchet bar. A second leg of the torsion spring projects as a striker for resiliently engaging the primer tubes and is disposed so that its path of travel is aligned with the overlying primer tubes. A hand engageable means is attached to one end of the ratchet bar and is externally accessible for manual indexing to operate the signal device.

BRIEF DESCRIPTION OF THE DRAWINGS

This invention will be more fully described in conjunction with the accompanying drawings, in which.

DESCRIPTION OF PREFERRED EMBODIMENT

Figure 1:
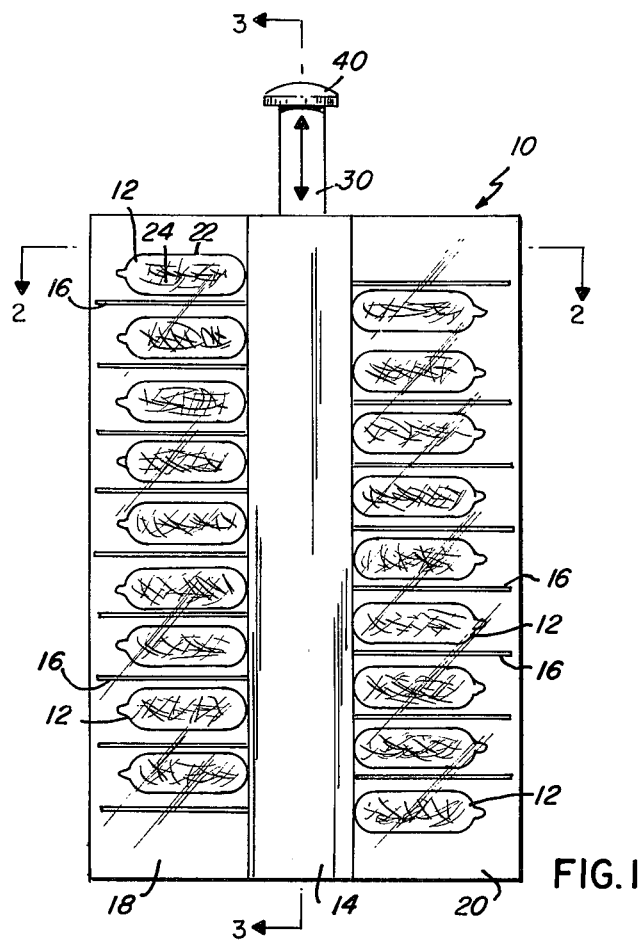
FIG. 1 is an elevational view of the exterior of a signal device using percussive flashlamps in accordance with the invention.

In the specific embodiment shown in the drawings, the flashlamp assembly is illustrated as a signal device 10 comprising a plurality of percussively ignitable flashlamps 12 mounted in two paralle rows, respectively disposed on opposite sides of a central support member 14. In order to prevent sympathetic ignition of adjacent lamps, the device further includes a plurality of light-shield partitions 16 disposed between respective pairs of the flashlamps. An end portion of each partition 16 may be secured to support member 14 by being wedge into a slot therein. To complete the unit, a pair of covers 18 and 20 are secured to each side of the support member 14 so as to enclose the planar array of lamps and partitions.

Each of the lamps 12 is substantially identical and comprises an hermetically sealed light-transmitting envelope 22 having a primer depending therefrom and a filling of combustible foil 24 and a combustion supporting gas disposed therein (see FIG. 1). The primer comprises a metal tube 26 (see FIG. 2) within which a wire anvil and a charge of fulminating are disposed. Each lamp is supported on member 12 by means of a respective bore 28 into which the primer tube 26 is inserted.

Sequential firing of the array of lamps is effected by a selective mechanism including a single self-cocking helical torsion spring which is ratchet-indexed to cause a striker leg projecting from the spring to be successively cocked by sliding engagement with the primer tube of a used lamp and thereafter released to hit and indent the next impact sensitive primer tube.

Figure 2:
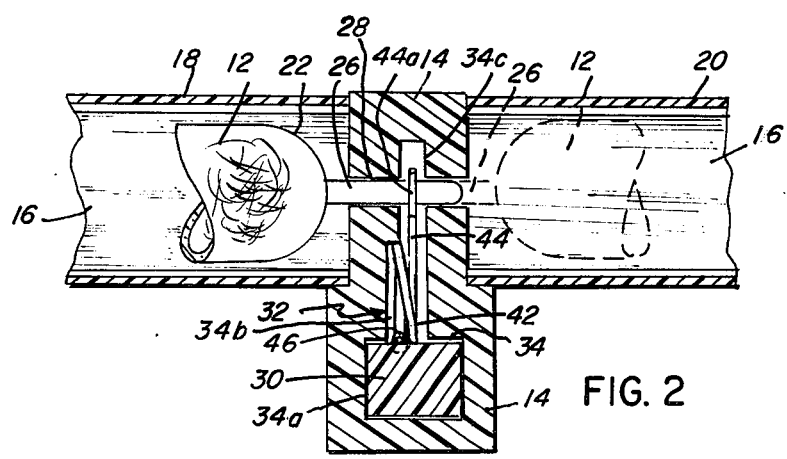
FIG. 2 is an enlarged sectional view on line 2—2 of FIG. 1 which shows the position of the selective firing mechanism with respect to the two rows of lamps and primer tubes thereof.
Figure 3:
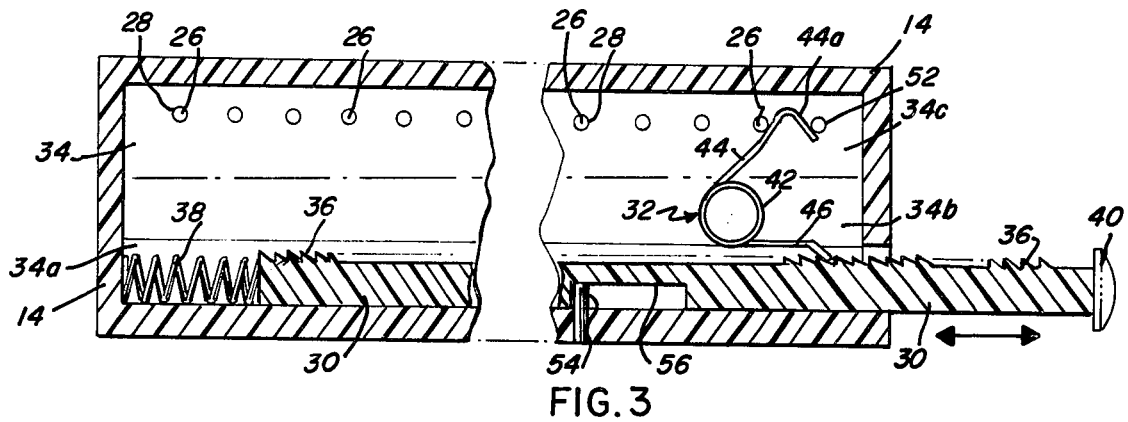
FIG. 3 is an enlarged sectional view on line 3—3 of FIG. 1 which shows the selective firing mechanism and its position with respect to the row of lamp primer tubes.

Referring to FIGS. 2 and 3, the selective firing mechanism comprises a spring loaded ratchet bar 30 and a slidable member 32 which are retained in a longitudinal channel 34 located parallel to the row of flashlamps 12. As shown in FIG. 2, channel 34 has a sectional configuration including a large rectangular base portion 34a, a narrower portion 34b, and a narrow upper vertical slot 34c. The ratchet bar 30 is illustrated as having a rectangular crosssection, and being retained in the base portion 34a of the channel. As best shown in FIG. 3, the top portion of the ratchet bar is provided with a plurality of sawtooth-shaped ratchet teeth 36, and the bar 30 is urged to the right (in FIG. 3) by means of a coiled compression spring 38 retained in channel portion 34a and secured at the left end to the support member 14 and at the right end to the end of the ratchet bar. A push button 40 is disposed on the exterior of the support member and attached to the right end of the ratchet bar 30, which passes through a rectangular opening provided therefor in an end wall of the channel. In this manner, button 40 is conveniently accessible for hand actuation.

The lamp mounting bores 28, which typically having a somewhat square cross-section, pass through the channel slot protion 34c. Hence, when the percussive flashlamps 12 are mounted on the support member 14 as shown, the primer tubes 26 pass through the bores 28 and traverse slot 34c to thereby overlie channel 34. In the embodiment illustrated, the flashlamps 12 are mounted on opposite sides of the support member 14 with the primer tubes 26 of respective flashlamp rows projecting in opposite directions in a common plane overlying channel 34. Further, the primer tubes of one row of flashlamps are interlocated with the primer tubes of the other row of flashlamps.

Figure 4:
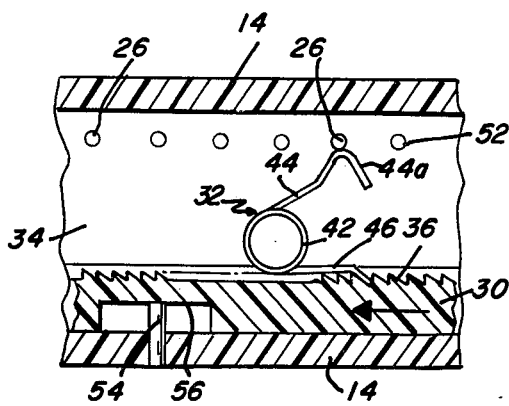
FIG. 4 is an enlarged fragmentary detail view showin the helical torsion spring of the mechanism of FIG. 3 translated to a position whereby the striker leg thereof is in a cocked condition; and, FIG. 5 is an enlarged fragmentary detail view of the mechanism showing on alternative embodiment of the helical torsion spring.

Slidable member 32 comprises a helical torsion spring having a coil portion 42 retained in channel portion 34b, a first leg 44 projecting upwardly into slot 34c for resiliently engaging one of the overlying primer tubes 26, and a second leg 46 for engaging one of ratchet teeth 36 of the spring loaded bar 30. As shall be described hereinafter, the resilient projecting leg 44 functions as a self-cocking striker for successively firing the lamps of the array. Hence, the position of striker 44 in slot 34c provides a path of travel in alignment with all of the overlying primer tubes 26 of the flash lamps in the device. The upwardly extending segment of striker leg 44 is shaped as shown so that, as the spring 32 is translated part way through its cycle (FIG. 4), leg 44 will function as a cam surface against the resiliently engaged primer tube and be forced downwardly (FIG. 4) to thereby preenergize, or cock, the striker spring in anticipation of firing the next lamp. Striker leg 44 of the torsion spring also has an angular segment 44a shaped to engage the primer tube of the previously fired flashlamp to thereby prevent the torsion spring from sliding to the right (in FIG. 3) and, thus, reversing direction following indexing thereof.

Figure 5:
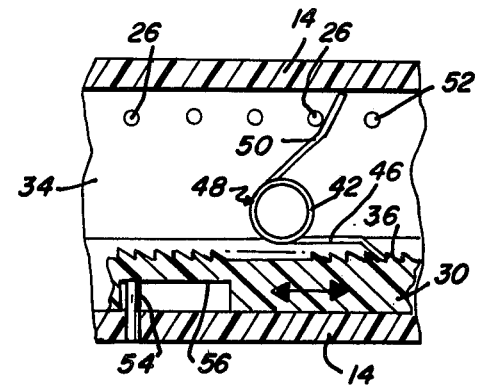

Alternatively, as shown in FIG. 5, a modified helical torsion spring, denoted by numeral 48, may be provided whigh has a striker leg 50 shaped to extend to the top of slot 34c for engaging the upper surface of the channel portion 34c to prevent the slidable torsion spring from reversing direction following indexing. This upper surface of channel portion 34c may comprise a smooth, soft plastic material, whereby the end of th striker leg 50 digs into the soft plastic to prevent sliding in one direction.

Prior to use of th device, the mechanism is armed (e.g., in the factory) by placing the striker leg 44 against a cocking pin 52 which overlies channel slot 34c in advance of and in parallel with the primer tubes 26. The device is now ready to fire lamps sequentially upon successive hand actuation of the spring loaded ratchet bar 30, in plunger fashion, by pushing button 40 against the end of the support member 14. Button 40, and thus ratchet bar 30, is depressed a distance equal to or greater than the common spacing between lamp centers. This motion causes a simultaneous engagement and linear displacement of the ratchet bar and helical torsion spring. Engagement of the mating parts is assured by the sawtooth surface which is molded or machined on the ratchet surface abutting spring leg 46. Upon thus translationally indexing slidable spring 32 along channel 34, the striker leg 44 is pushed downwardly (as viewed in FIG. 3) during its sliding excursion under pin 52 to thereby cause a compression and thus energization of the torsion spring leg 44. This stored energy in leg 44 is suddenly released as the end of striker leg 44 (i.e., at the reverse bend which forms segment 44a) passes pin 52. The striker 44 then swings counterclockwise (as viewed in FIGS. 3 and 4) and hits and indents the impact sensitive primer tube 26 at a high velocity to cause deflagration of the fulminating material located therein and thus ignite the combustible foil 24.

The ratchet bar is prevented from translating too far to the left (in FIG. 3) during the firing stroke by means of a stop pin 54 secured in the bottom wall of channel portion 34a and received in a slot 56 in the bottom of ratchet bar 30. The left end of slot 56 (in FIG. 3) fixes the outward extension of button 40 when the ratchet is in the rest position, and the right end of the slot 56 sets the above-mentioned limit on the firing stroke for translating the helical torsion spring 32.

Release of pressure on button 40 at the end of the firing stroke returns the ratchet bar 30 to its original position as a result of the release of stored energy in compression spring 38, which had been energized during the firing stroke. Backward movement of the helical torsion spring during the return stroke is impeded by the short leg segment 44a which comes to rest against pin 52. FIG. 3 illustrates this rest position of the device after firing the first lamp. If the alternative torsion spring configuation of FIG. 5 is employed, the backward movement is impeded by the end of striker leg 50 digging into the upper surface of channel 34. Repeated displacement of trigger button 40 will cause the cycle to repeat, with the most recently expended primer tube 26 performing the function of pin 52, until such time as the helical torsion spring travels the full length of channel 34 triggering all lamps in sequence. In the particular embodiment of FIGS. 1 and 2, wherein the flashlamp rows are mounted on opposite sides of the support member with the primer tubes of one row interlocated with the primer tubes of the other row, indexing of the helical spring 32 along the channel causes the striker 44 to fire respective ones of the flashlamps of the two rows thereof in alternate sequence.

In addition to the above-described components, the signal device assembly may further include a sheet of reflecting material (not shown) along the interior of what may be called the rear side wall of covers 18 and 20. The reflecting surface of this sheet is inserted so as to face the lamps and function as a reflector of visible light to enhance the signaling affect, as a heat shield with respect to the hand of the user, or as a mirror for daytime signaling purposes. The exterior surfaces of partitions 16 may also be made reflecting, such as by aluminizing, if desired. In addition to the reflector sheet insert, a filter sheet (not shown), such as a cellulose acetate color filter, approximately the same size as the reflector insert may be secured to the opposite inside surface of the cover, i.e., and light transmitting side wall thereof. This color filter, whether blue, yellow, orange, red or other color may serve to draw more attention to the device upon firing, or also function as a decorative feature.

Prior to initial operation, the helical torsion spring is positioned to one end of the longitudinal channel 34 with striker 44 engaging pin 52, the lamps and shields are inserted, and the covers 18 and 20 are secured, such as by adhesive or heat sealing, to support member 14. To operate the device, a user simply grasps the periphery of the unit enclosure with one hand, faces the lamps in the direction of the intended viewer, and with his index finger pushes button 40 to translate the helical torsion spring, whereby its striker leg is cocked and released to fire a flashlamp. The resulting flash of light output, is both attention-getting and readily observable at significant distances, even in daylight. Repeated light flashes may be produced simply by repeated finger indexing of push button 40.

The flashlamps employed in the signal device may be similar to those described in U.S. Pat. No. 3,535,063. Covers 18 and 20 may be molded of transparent polystyrene, and support member 14 and ratchet bar 30 may be molded of a phenolic plastic or fabricated of plexiglass.

In one specific embodiment, the helical torsion spring was fabricated of 0.029 inch diameter piano wire. The diameter of the coil portion 42 of the torsion spring was about 0.25 inch. A one turn coil was used. Leg segment 44 (not including 44a ) was approximately ⅜ inch in length, and segment 46 was about ⅝ inch in length.

The above described device provides a number of significant advantages over prior flash lamp arrays. First, the firing mechanism is considerably simplified. For example, a 16 lamp array would require only two springs (compression spring 38 and torsion spring 32) compared to the need for a total of 18 springs for the device described in the aforementioned application Ser. No. 695,991. This simplicity assures reduced manufacturing costs. Second this device does not require a larger package length to accommodate individual firing springs for each lamp. This feature facilitates miniaturization. Further, there are no protruding springs to mask the emitted light and detract from the aesthetics of packaging.

Although the invention has been described with respect to specific embodiments, it will be appreciated that modifications and changes may be made by those skilled in the art without departing from the scope of the invention. For example, the dimensions and design of the helical torsion spring may be modified. In fact, in lieu of the helical torsion spring, other types of slidable members with resilient striker means may be employed. The lamps may be aligned in a linear array on one side of the support member, rather than in the planar array illustrated. The ratchet bar may be actuated by hand engageable means other than a push button. Further, although specifically illustrated as a signal device, it is readily contemplated that the described flashlamp assembly with selective firing mechanism may be adapted as a photoflash unit by the addition of suitable reflectors and provision of an appropriate linkage to a camera shutter release mechanism.

What I claim is:

1. A selective firing mechanism for a flashlamp assembly including a plurality of percussively ignitable flashlamps mounted in a row on a support member; the selective firing mechanism comprising, in combination:
a longitudinal channel in said support member located parallel to said row of flashlamps;
a spring loaded ratchet bar retained in said channel;
a single slidable member retained in said channel in releasable engagement with said ratchet bar; and,
a single striker means provided on said slidable member for resiliently engaging all of said flashlamps successively and operative to sequentially fire respective ones of said flashlamps in response to successive actuation of said ratchet bar and the resulting indexing of the slidable member releasably engaged therewith along said channel.

2. The mechanism of claim 1 wherein each of said flashlamps has a primer tube depending therefrom; said support member contains a plurality of bores each for receiving the primer tube of a respective one of said flashlamps to provide support therefor, said flashlamps being mounted with the primer tubes thereof overlying said channel; and said striker means is adapted for resiliently engaging said overlying primer tubes of the flashlamps.

3. The mechanism of claim 2 wherein said striker means is a resilient projection from said slidable member disposed so that its path of travel is aligned with the overlying primer tubes of said flashlamps, and said slidable member is operative upon translation along said channel to selectively fire said flashlamps by means of said resilient projection.

4. The mechanism of claim 3 wherein said ratchet bar has a plurality of sawtooth-shaped ratchet teeth on a surface thereof, and said slidable member has means for releasably engaging one of said ratchet teeth.

5. The mechanism of claim 4 wherein said slidable member is a helical torsion spring having a first leg comprising said striker means and a second leg comprising said means for releasably engaging the ratchet teeth.

6. The mechanism of claim 5 wherein said first leg of the torsion spring has an angular segment shaped to engage the primer tube of the previously fired flashlamp to thereby prevent the slidable torsion spring from reversing direction following indexing thereof.

7. The mechanism of claim 5 wherein the end of said first leg of the torsion spring is shaped for engaging a surface of said support member channel to thereby prevent the slidable torsion spring from reversing direction following indexing thereof.

8. The mechanism of claim 1 wherein said ratchet bar is spring loaded by means of a coiled compression spring secured at one end by means attached to said ratchet bar and secured at the other end by means attached to said support member.

9. The mechanism of claim 1 wherein said assembly is a signal device intended for hand operation, and said spring loaded ratchet bar is adapted to be directly actuated by hand.

10. The mechanism of claim 9 wherein a push button is attached to one end of said ratchet bar and disposed on the exterior of said support member, whereby said button is accessible for actuation by hand.

11. A flashlamp assembly comprising, in combination:
a support member containing a longitudinal channel;
a spring loaded ratchet bar retained in said channel;
a single slidable member retained in said channel in releasable engagement with said ratchet bar;
a plurality of percussively-ignitable flashlamps mounted on said support member; and
a single striker means projecting from said slidable member and adapted for resiliently engaging all of said flashlamps successively;
said slidable member being operative upon translation along said channel to selectively fire said flashlamps by means of said striker means.

12. The assembly of claim 11 wherein each of said flashlamps has a primer tube depending therefrom; said support member contains a plurality of bores each for receiving the primer tube of a respective one of said flashlamps to provide support therefor, said flashlamps being mounted with the primer tubes thereof overlying said channel; and said striker means projecting from said slidable member is disposed so that its path of travel is aligned with said overlying primer tubes of the flashlamps and adapted for resiliently engaging said primer tubes.

13. The combination of claim 12 wherein said assembly is a signal device intended for hand operation, and said spring loaded ratchet bar is adapted to be directly actuated by hand.

14. The signal device of claim 13 wherein a push button is attached to one end of said ratchet bar and disposed on the exterior of said support member, said ratchet bar being operative in response to successive hand actuation thereof by means of said button to cause said slidable member to be indexed along said channel and thereby sequentially fire said flashlamps by means of said projecting striker means.

15. The signal device of claim 13 further including a plurality of light-shield partitions disposed between respective pairs of said flashlamps; a cover affixed to said support member and enclosing said flashlamps and partitions; said cover having at least one transparent sidewall; and hand engageable means attached to said ratchet bar and disposed on the exterior of the enclosure formed by said cover and support member, whereby said hand engageable means is accessible for indexing.

16. The signal device of claim 13 wherein said flashlamps are mounted in two parallel rows on said support member with said longitudinal channel located between and parallel to said rows of flashlamps and with the primer tubes of both flashlamps overlying said channel.

17. The signal device of claim 16 wherein said two rows of flashlamps are mounted on opposite sides of said support member with the primer tubes of respective flashlamp rows projecting in opposite directions in a common plane overlying said channel, the primer tubes of one row of flashlamps being interlocated with the primer tubes of the other row of flashlamps whereby, upon successive actuation of said ratchet bar and the resulting indexing of the slidable member releasably engaged therewith along said channel, said striker means is operative to fire respective ones of said flashlamps of the two rows thereof in alternate sequence.

* * * * *